ENCLOSURE FOR HIGH VOLTAGE APPARATUS

Filed Aug. 19, 1963 2 Sheets-Sheet 1

INVENTORS
JOHN STARK, JR.,
BETHEL E. DENTON &
JAMES W. McLEOD
BY [signature]
Attorney INVENTORS
JOHN STARK, JR.
BETHEL E. DENTON &
JAMES W. McLEOD W. H. Sprague
Attorney United States Patent Office 3,273,021

Patented Sept. 13, 1966

3,273,021

ENCLOSURE FOR HIGH VOLTAGE APPARATUS

John Stark, Jr., Indianapolis, Ind., Bethel E. Denton, Robards, Ky., and James W. McLeod, Jr., Indianapolis, Ind., assignors to Radio Corporation of America, a corporation of Delaware Filed Aug. 19, 1963, Ser. No. 302,864

4 Claims. (Cl. 317—100)

Figure 1:
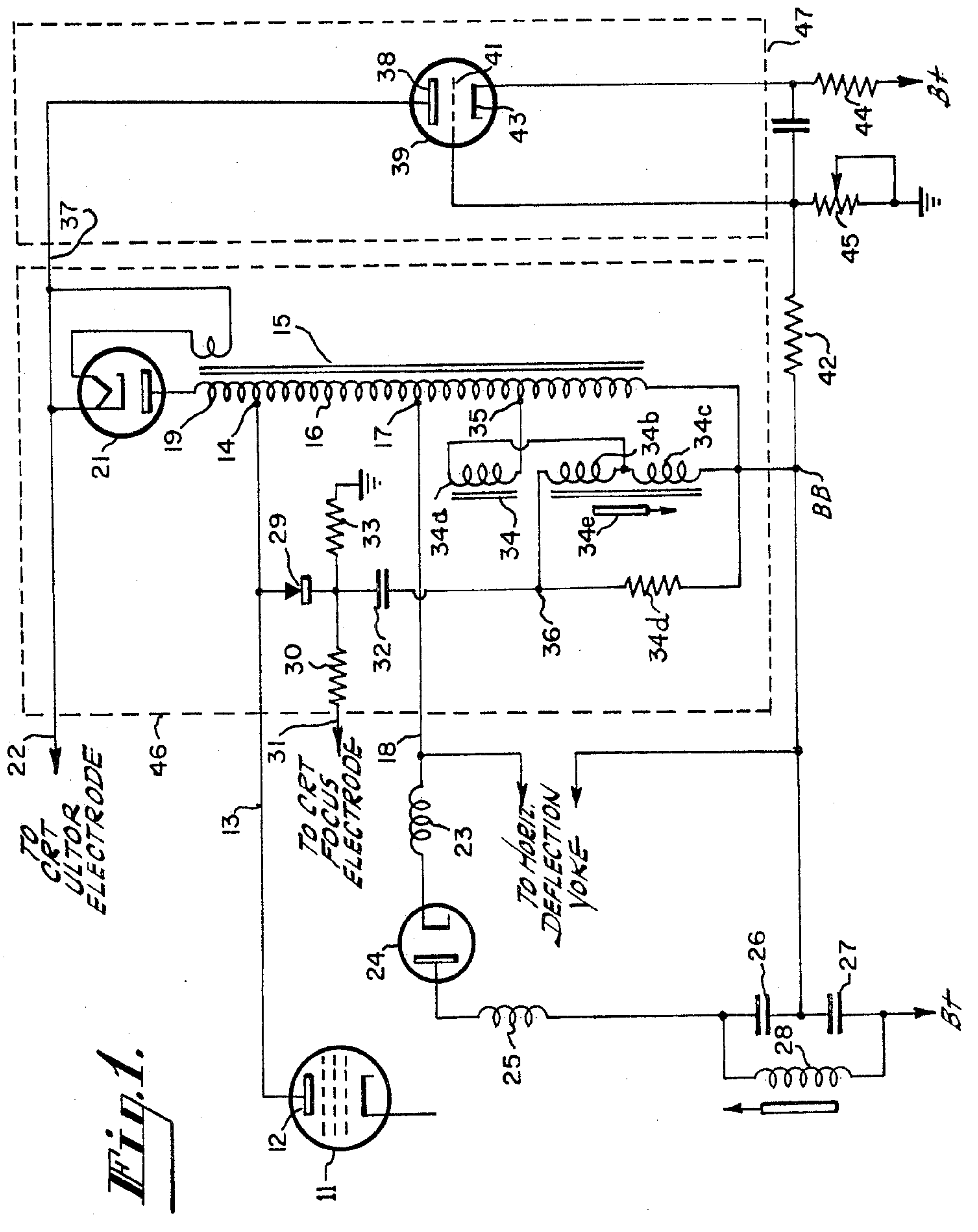

This invention relates to enclosures for high voltage apparatus and particularly to protective enclosures for certain horizontal deflection and high voltage apparatus of color television receivers.

It has been the practice to place certain television receiver components such as the horizontal deflection output transformer and the high voltage rectifier in enclosures for protection of personnel against the high voltages developed thereby for operation of the picture cathode ray tube and other apparatus. These voltages, developed from flyback pulses occurring during the horizontal or line retrace intervals, have magnitudes of several thousand volts. Typically, for a black and white receiver a voltage of the order of 20,000 volts is used. In color television receivers higher voltages are used and a voltage regulator tube is employed to maintain the high voltage substantially constant for suitable operation of the receiver. In such apparatus a typical voltage is nominally about 24,000 volts. The regulator tube also has been mounted in the protective enclosure. During operation of such apparatus considerable heat is produced, particularly by the high voltage regulator tube.

Because of the heat and high voltage developed by the enclosed apparatus the horizontal deflection output transformer used in color television receivers has been protected by a flame resistant coating. Nevertheless as an extra precaution the protective enclosure has been made relatively air-tight so as to provide a combustion-inhibiting environment for this transformer. Such an enclosure, however, serves to aggravate the heat problem.

Accordingly, one feature of the apparatus embodying the present invention is the provision of a protective enclosure having a relatively air-tight compartment to house the horizontal output transformer and a separate ventilated compartment to house the high voltage regulator tube. Thus, a major source of heat in the form of the regulator tube is removed from the vicinity of the transformer so that the transformer remains in a combustion-inhibiting environment. Also, by this means, cooling of the regulator tube, not heretofore feasible, is effected by the ventilated compartment.

By reason of the particular type of high voltage regulator tube employed there is a possibility of the generation of X-rays by the tube under certain abnormal operating conditions. Accordingly, the ventilated compartment in which the regulator tube is mounted is constructed in a manner to also provide an effective shield to prevent the propagation of any X-rays outside of the compartment.

The horizontal deflection output tube used in a television receiver also is a source of considerable heat. It has been the practice heretofore to mount such a tube outside of, but adjacent to, the protective enclosure for the high voltage components. In accordance with another feature of the apparatus embodying the present invention, the horizontal output tube is mounted outside of the enclosure in such a position relative to the ventilated compartment and to the chassis as to provide effectively a forced draft through the ventilated compartment. Thus, both the horizontal output and high voltage regulator tubes operate at materially lower temperatures than in the apparatus previously used.

Figures 2, 3:
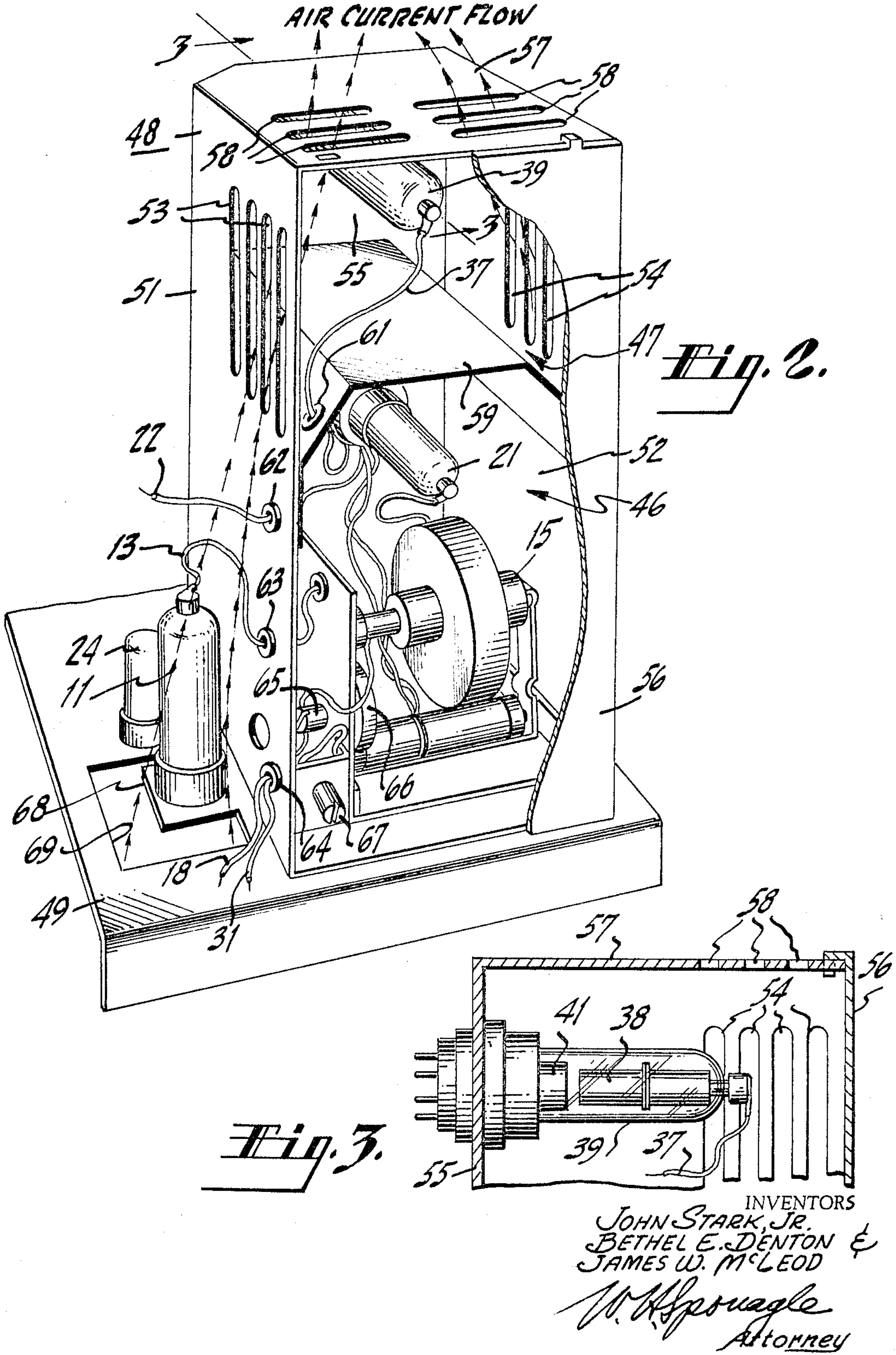

For a better understanding of the invention, reference now is made to the following description taken in conjuction with the accompanying drawings, of which:

FIGURE 1 is a fragmentary schematic circuit diagram of the major components of the horizontal deflection and high voltage portions of a color television receiver including those components which are associated with the present invention;

FIGURE 2 is a perspective view of a portion of a color television chassis including a protective enclosure with the cover thereof partially broken away and embodying the present invention; and, FIGURE 3 is a sectional view of the protective enclosure taken on the line 3—3 of FIGURE 2 and showing the relationship of the high voltage regulator tube with the shielding and ventilated portions of the protective enclosure.

Reference first will be made to FIGURE 1. The horizontal output tube 11 has its anode 12 connected by a conductor 13 to a point 14 on the horizontal deflection output transformer 15. The winding 16 of this transformer between the point 14 and the terminal B—B also has an intermediate point 17 which is connected by a lead 18 to one terminal of the horizontal deflection yoke (not shown). The other terminal of the yoke is connected to the terminal B—B of the transformer winding 16. Alternatively, the other yoke terminal may be connected to the winding 16 at a suitable point intermediate the terminal B—B and the point 17. The output transformer also is provided with a high voltage winding 19 between the point 14 and a high voltage rectifier diode 21. The high voltage produced by rectifying the flyback pulses developed in the transformer windings during horizontal retrace periods is applied by a lead 22 to the final anode or ultor electrode of the cathode ray color picture tube (not shown).

The intermediate point 17 of the transformer winding 16 also is connected through a choke coil 23 to a damper diode 24 which in turn is connected through another choke coil 25 and capacitors 26 and 27 to a source of B+ voltage as indicated. A variable linearity adjusting inductor 28 is connected in parallel with the series arrangement of the capacitors 26 and 27, As a result of the periodic conduction of the damper diode 24, the familiar boosted B+ voltage is developed at the junction point of the capacitors 26 and 27 and applied to the B—B terminal.

Also connected to the point 14 of the horizontal deflection output transformer winding is a focus rectifier 29 which is connected through a current-limiting resistor 30 and by a lead 31 to the focus electrode system of the cathode ray color picture tube (not shown). The focus rectifier apparatus is provided with a filter circuit including a capacitor 32 and a resistor 33. This apparatus also includes an inductor 34 comprising two input windings **34*a* and 34*c*, an output winding 34*b* and a damping resistor 34*d*. The focus voltage is controlled by adjusting a movable core 34*e*. The input winding 34*a* is connected to the horizontal output transformer winding 16 at a point 35 where a pulse of smaller amplitude (measured to ground) is produced compared to the pulse amplitude at point 14. Adjustment of the core 34*e* produces a control pulse at point 36 of such amplitude and polarity that, when it is applied to the focus rectifier 29 by the capacitor 32, a desired focus voltage is developed for impression upon the cathode ray color picture tube by lead 31**.

The high voltage rectifier 21 also is connected by a lead 37 to the anode 38 of a high voltage regulator tube 39. The grid 41 of this tube is connected by a current limiting resistor 42 to the terminal B—B of the horizontal output transformer 15 for response to any boosted B+ voltage variations which in turn represent any variations in the high voltage at the ultor electrode of the cathode ray tube. The cathode 43 of the regulator tube 39 is connected by a resistor 44 to the source of B+ potential as indicated. The magnitude of the high voltage impressed upon the high voltage lead 22 is controlled by a variable resistor 45 connected to the grid 41 of the regulator tube 39.

The apparatus described up to this point is substantially that used in color television receivers such as that covered by Color Television Service Data-File: 1962 No. T6 covering the CTC–12 color television chassis manufactured by Radio Corporation of America.

As indicated in FIGURE 1 such apparatus as the horizontal deflection output transformer 15, the high voltage rectifier 21, the focus rectifier 29 and the focus voltage control apparatus 34 is mounted in a relatively air tight compartment 46 of a protective enclosure 48 to be described subsequently. It is to be understood that this compartment may also contain various other components such as capacitors, resistors, potentiometers and the like associated with the described horizontal deflection and high voltage circuits. Also, the high voltage regulator tube 39 is mounted in an adjacent compartment 47 which is ventilated for heat dissipation and shielded for any X-radiation which may result under abnormal operating conditions.

Referring now to FIGURE 2 of the drawings, that portion of the television receiver chassis including the protective enclosure 48 for the high voltage apparatus will be described. This view of the chassis is from the rear of the cabinet housing the television receiver. In the following description and in the claims the term "forward" will be used to indicate the portion of the cabinet facing the viewer of the reproduced picture and the term "rear" will be used to indicate the opposite cabinet side normally not in view. It is to be understood, however, that these terms are used for clarity and not for the purpose of unnecessarily limiting the invention. Also, components shown schematically in FIGURE 1 are identified in FIGURE 2 by the same reference characters.

The protective enclosure 48 is located generally at the rear and to one side of the main chassis 49 which is mounted horizontally in the receiver cabinet. The enclosure consists of two side walls 51 and 52 both of which are generally of unbroken metallic sheet material except for a series of louvers 53 and 54 extending vertically and located in the upper rear portions of the sides. The forward wall 55 of the enclosure is entirely unbroken as is the rear cover 56 which preferably is removably attached to the enclosure in a suitable manner. The top 57 of the enclosure is unbroken in the forward portion and is provided in the rear portion thereof with a plurality of transverse louvers 58.

The interior of the enclosure 48 is divided into the relatively air-tight compartment 46 and the ventilated compartment 47 (previously referred to in the description of FIGURE 1) by a partition 59 extending between the side walls 51 and 52 in one direction and from the front wall 55 to the rear cover 56 of the enclosure 48. This partition is of substantially unbroken metallic material and is provided with a small opening containing an insulating grommet 61 through which the flexible lead 37 extends from the high voltage rectifier tube 21 in the lower compartment 46 to the regulator tube 39 in the upper compartment 47.

The side wall 51 is provided with a number of small openings in its lower portion included in the relatively air-tight compartment 46 and in which are mounted insulating grommets 62, 63 and 64. The flexible lead 22 from the high voltage rectifier tube 21 to the ultor electrode of the cathode ray tube passes through the grommet 62. The flexible lead 13 from the output transformer 15 to the anode cap of the horizontal output tube 11 passes through the grommet 63. Flexible lead 18 from the horizontal output transformer 15 to the deflection yoke and flexible lead 31 from the focus rectifier apparatus including the voltage control inductor 34 to the focus electrode of the cathode ray tube passes through the grommet 64. There also is provided in the side wall 51 another small opening to provide access to a small shaft 65 by which to adjust a potentiometer 66 (not shown in FIGURE 1) mounted in the lower compartment 46 for controlling raster-centering as shown and described in the RCA service data pamphlet referred to. A similar small opening (not shown) is provided in the rear cover to provide access to a control element 67 (e.g., the core **34*e* of FIGURE 1) by which to adjust the focus voltage control apparatus 34. These openings in the side wall 51 and rear cover 56 of the enclosure 48 are so small that they do not detract materially from the relative air-tightness of the lower compartment 46**.

The horizontal deflection output tube 11 is mounted on a shelf 68 elevated from the chassis 49 over an opening 69 in the chassis. One convenient way of providing such a shelf is by suitable bending of the sheet metal removed from the chassis to provide the opening 69. By means of this tube mounting, air flows freely through the opening 69 past the output tube 11 and is raised in temperature by the heat produced by the output tube. This tube is mounted in such relationship to the protective enclosure 48 and the louvers 53 that the air which is heated by the tube is drawn into the louvers 53 in the adjacent side wall 51 of the enclosure. By such means there is effectively created a forced draft through the upper compartment 47 so as to absorb additional heat from the regulator tube 39. The air ultimately passes through the louvers 58 in the top 57 of the enclosure. Additional cooling of the regulator tube is provided by air entering through the louvers 54 of the side wall 52. It has been found that the described construction enables both the horizontal output tube 11 and the high voltage regulator tube 39 to operate at approximately 40° F. below their respective allowable maximum operating temperatures.

The effectiveness of the described enclosure 48 in not only ventilating the upper compartment 47 so as to cool the regulator tube 39 but also to effectively shield any X-radiation produced by this tube may be seen by additional reference to FIGURE 3. The X-radiation, if it occurs, emanates from the space between the control grid 41 and the anode 38 of this tube which, as used in the CTC–12 color television receiver covered by the RCA service data pamphlet referred to, may be a 6BK4 type. The side walls 51 and 52, the top 57 and the partition 59 dividing the two compartments 46 and 47 all are of unbroken metal sheets in the vicinity of the gap between the control grid 41 and the anode 38 of the regulator tube 39. Such structure provides effective shielding for any X-radiation which might occur during abnormal operating conditions of this apparatus.

What is claimed is:

1. In a television receiver having a substantially horizontal chassis for supporting particular components including a horizontal deflection output tube and transformer, a high voltage rectifier tube connected to said transformer, and a high voltage regulator tube connected to said rectifier tube, said transformer producing only a small amount of heat in normal operation but being subject to damage by high temperatures, said rectifier tube producing only a relatively small amount of heat in normal operation, said output and regulator tubes respectively producing relatively large amounts of heat in normal operation, and said regulator tube also being capable of producing unwanted radiations under abnormal operating conditions, mounting means for said particular components comprising:

a shelf attached to, and elevated over an opening in, said chassis to mount said output tube in a vertical position so that heat from said tube causes air to be drawn through said opening and raised in temperature, thereby cooling said output tube;

a relatively air-tight metallic compartment mounted on said chassis for enclosing said transformer and said rectifier tube in a combustion-inhibiting environment; and a ventilated metallic compartment having forward and rear portions, said compartment being disposed above said relatively air-tight compartment for enclosing and mounting said regulator tube on its forward wall, all of the walls in the forward portion of said ventilated compartment being unbroken to prevent external propagation of any of said unwanted radiations and at least some of the external walls in the rear portion of said ventilated compartment being louvered to conduct air heated by said regulator tube out of said ventilated compartment, thereby cooling said regulator tube, and one of said louvered walls being positioned relative to said output tube so that the air heated by said output tube is drawn through said ventilated compartment, thereby effectively providing forced ventilation of said ventilated compartment and enhancing the cooling of said output and regulator tubes.

2. In a television receiver having a substantially horizontal chassis for supporting particular components including a horizontal deflection output tube and transformer, a high voltage rectifier tube connected to said transformer and a high voltage regulator tube connected to said rectifier tube, said transformer producing only a small amount of heat in normal operation but being subject to damage by high temperatures, said rectifier tube producing only a relatively small amount of heat in normal operation, said output and regulator tubes respectively producing relatively large amounts of heat in normal operation, and said regulator tube also being capable of producing unwanted radiations under abnormal operating conditions, mounting means for said particular components comprising:

a shelf attached to, and elevated over an opening in, said chassis to mount said output tube in a vertical position so that heat from said tube causes air to be drawn through said opening and raised in temperature, thereby cooling said output tube;

a relatively air-tight metallic compartment mounted on said chassis for enclosing said transformer and said rectifier tube in a combustion-inhibiting environment; and a ventilated metallic compartment having forward and rear portions, said compartment being disposed above said relatively air-tight compartment for enclosing and mounting said regulator tube in a horizontal position on its forward wall, all of the walls in the forward portion of said ventilated compartment being unbroken to prevent external propagation of any of said unwanted radiations and the top and at least one of the external side walls in the rear portion of said ventilated compartment being louvered to conduct air heated by said regulator tube out of said ventilated compartment, thereby cooling said regulator tube, and said one louvered side wall being adjacent to said output tube so that the air heated by said output tube is drawn through said ventilated compartment, thereby effectively providing forced ventilation of said ventilated compartment and enhancing the cooling of said output and regulator tubes.

3. In a television receiver having a substantially horizontal chassis for supporting particular components including a horizontal deflection output tube and transformer, a high voltage rectifier tube connected to said transformer, and a high voltage regulator tube connected to said rectifier tube, said transformer producing only a small amount of heat in normal operation but being subject to damage by high temperatures, said rectifier tube producing only a relatively small amount of heat in normal operation, said output and regulator tubes respectively producing relatively large amounts of heat in normal operation, and said regulator tube also being capable of producing unwanted radiations under abnormal operating conditions, mounting means for said particular components comprising:

a shelf attached to, and elevated over an opening in, said chassis to mount said output tube in a vertical position so that heat from said tube causes air to be drawn through said opening and raised in temperature, thereby cooling said output tube;

a relatively air-tight metallic compartment mounted on said chassis for enclosing said transformer and said rectifier tube in a combustion-inhibiting environment; and a ventilated metallic compartment having forward and rear portions, said compartment being disposed above and adjacent to said relatively air-tight compartment and forming a unitary structure therewith for enclosing and mounting said regulator tube in a horizontal position on its forward wall, all of the walls in the forward portion of said ventilated compartment being unbroken to prevent external propagation of any of said unwanted radiations and at least some of the external walls in the rear portion of said ventilated compartment being louvered to conduct air heated by said regulator tube out of said ventlated compartment, thereby cooling said regulator tube, and one of said louvered walls being adjacent to said output tube so that the air heated by said output tube is drawn through said ventilated compartment, thereby effectively providing forced ventilation of said ventilated compartment and enhancing tthe cooling of said output and regulator tubes.

4. In a television receiver having a substantially horizontal chassis for supporting particular components including a horizontal deflection output tube and transformer, a high voltage rectifier tube connected to said transformer and a high voltage regulator tube connected to said rectifier tube, said transformer producing only a small amount of heat in normal operation but being subject to damage by high temperatures, said rectifier tube producing only a relatively small amount of heat in normal operation, said output and regulator tubes respectively producing relatively large amounts of heat in normal operation, and said regulator tube also being capable of producing unwanted radiations under abnormal operating conditions, mounting means for said particular components comprising:

a shelf attached to, and elevated over an opening in, said chassis to mount said output tube in a vertical position so that heat from said tube causes air to be drawn through said opening past said output tube and raised in temperature, thereby cooling said output tube;

a relatively air-tight metallic compartment mounted on said chassis for enclosing said transformer and said rectifier tube in a combustion-inhibiting environment; and a ventilated metallic compartment having forward and rear portions, said compartment being disposed above and adjacent to said relatively air-tight compartment and forming a unitary structure therewith for enclosing and mounting said regulator tube in a horizontal position on its forward wall, all of the walls in the forward portion of said ventilated compartment being unbroken to prevent external propagation of any of said unwanted radiations and the top and two side external walls in the rear portion of said ventilated compartment being louvered to conduct air heated by said regulator tube out of said ventilated compartment, thereby cooling said regulator tube, and one of said louvered side walls being adjacent to said output tube so that the air heated by said output tube is drawn through said ventilated compartment, thereby effectively providing forced ventilation of said ventilated compartment and enhancing the cooling of said output and regulator tubes.

References Cited by the Examiner

UNITED STATES PATENTS

| | | | |
|---|---|---|---|
| 2,394,060 | 2/1946 | Holmes | 250—27.5 |
| 2,463,557 | 3/1949 | Pohm | 175—366 |
| 2,658,101 | 11/1953 | Coxe | 174—51 |
| 2,917,735 | 12/1959 | Travis | 340—367 |
| 2,947,957 | 8/1960 | Spindler | 336—61 |

ROBERT K. SCHAEFER, *Primary Examiner.*

KATHLEEN H. CLAFFY, *Examiner.*

H. J. RICHMAN, *Assistant Examiner.*